United States Patent

Endo

[11] Patent Number: 5,877,805
[45] Date of Patent: Mar. 2, 1999

[54] IMAGE READING DURING MOVEMENT OF AN IMAGING DEVICE

[75] Inventor: Azuchi Endo, Kanagawa-ken, Japan

[73] Assignee: Fuji Photo Film Co., Ltd., Kanagawa-ken, Japan

[21] Appl. No.: 950,585

[22] Filed: Oct. 15, 1997

Related U.S. Application Data

[63] Continuation of Ser. No. 471,017, Jun. 6, 1995, abandoned.

[30] Foreign Application Priority Data

Jul. 14, 1994 [JP] Japan .................................. 6-162273

[51] Int. Cl.$^6$ .................................................. H04N 5/225
[52] U.S. Cl. .......................... 348/218; 348/219; 348/296
[58] Field of Search .................................... 348/208, 218, 348/219, 241, 314, 296

[56] References Cited

U.S. PATENT DOCUMENTS

| | | | |
|---|---|---|---|
| 4,535,363 | 8/1985 | Harada et al. | 348/219 |
| 4,633,317 | 12/1986 | Uwira et al. | 348/219 |
| 4,985,775 | 1/1991 | Murayama et al. | 348/314 |
| 5,025,319 | 6/1991 | Mutoh et al. | 348/296 |
| 5,075,775 | 12/1991 | Kawaoka et al. | 348/296 |
| 5,402,171 | 3/1995 | Tagami et al. | 348/219 |

FOREIGN PATENT DOCUMENTS

| | | |
|---|---|---|
| 53-101939 | 9/1978 | Japan . |
| 64863 | 1/1989 | Japan . |
| 1-221065 | 9/1989 | Japan . |

Primary Examiner—Wendy Garber

[57] ABSTRACT

Image information for one screen is read while moving an image taking device so that a sampling position is shifted to make a round and to return the original position in n frames. The sampling position is shifted after stored signal charges of each of the n frames are transmitted to a transmission section and signal charges stored in a photoelectric conversion section are discharged at latest by the end of sampling position shift, thereby discharging outside signal charges stored during sampling position shift.

12 Claims, 4 Drawing Sheets

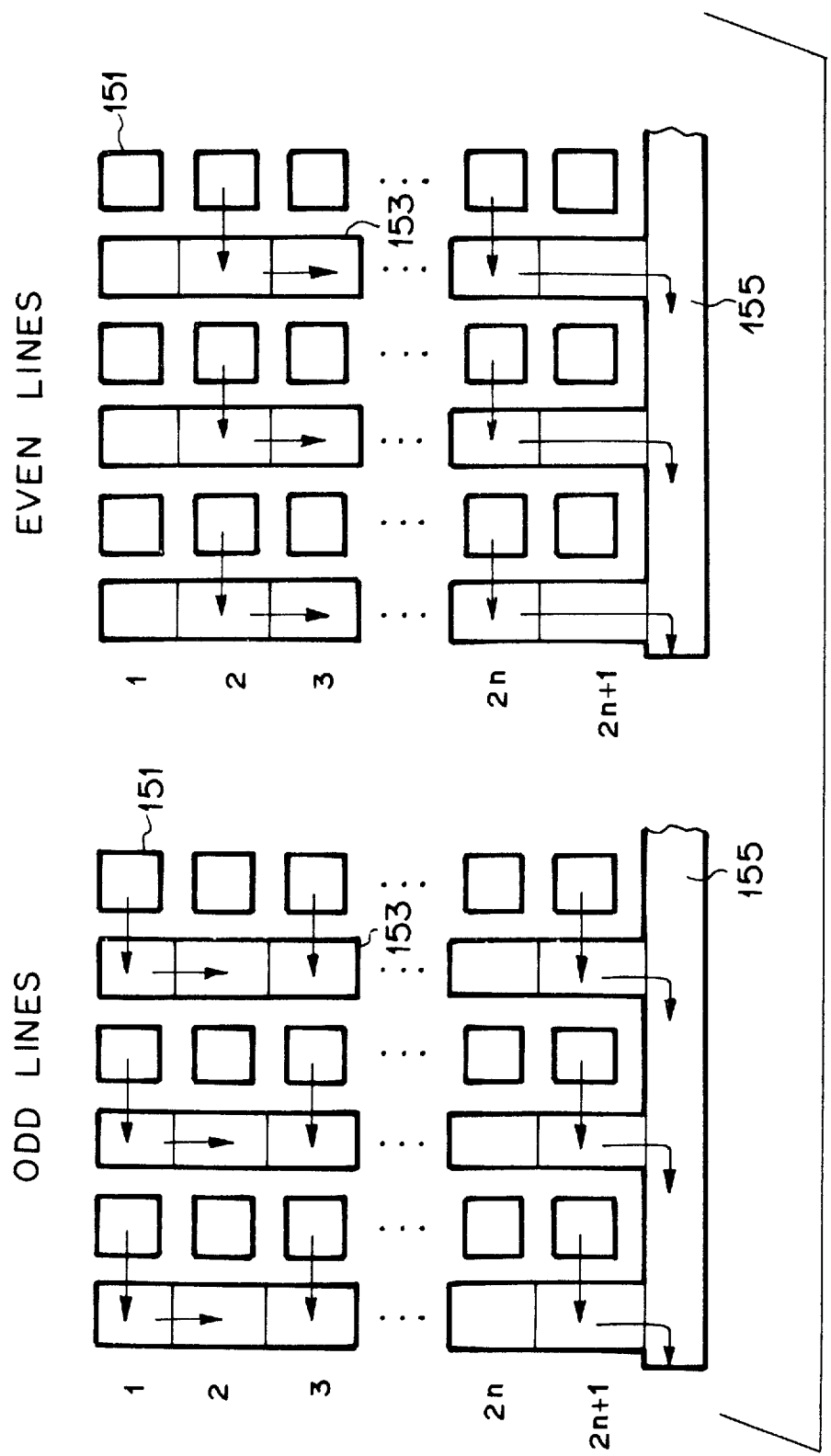

IMAGE READING DURING MOVEMENT OF AN IMAGING DEVICE

This application is a continuation of application Ser. No. 08/471,017 filed on Jun. 6, 1995, now abandoned.

BACKGROUND OF THE INVENTION

1. Field of the Invention

This invention relates to reading an image while moving an image taking device such as a CCD (charge coupled device) sensor, thereby obtaining a picture of high resolution.

2. Description of the Related Art

An image reader using an image taking device such as a CCD sensor has been rapidly put into wide use, and recently there is a demand for an image reader having a higher resolving power.

Resolving power of an image reader can be improved in various ways. For example, as disclosed in Japanese Unexamined Patent Publication Nos. 64(1989)-863, 53(1978)-101939 and 1(1989)-221065, by changing relative positions of picture elements of a CCD with time, thereby increasing sampling points, a high resolution picture can be obtained with a CCD having a relatively small number of picture elements. For example, shifting the CCD by a half of the picture element pitch in both the horizontal and vertical directions is equivalent to doubling the picture elements of the CCD in both the horizontal and vertical directions.

When the CCD is shifted in both the horizontal and vertical directions as described above, the image of one screen is formed by four frames which are sampled in different positions.

The resolving power of the image reader can be improved by moving the sampling-position as described above. However since the CCD stores signal charges even during shift, the resolving power cannot simply depend upon the number of picture elements.

Such a deterioration in the resolving power due to shift of the sampling position can be avoided by not using the signal charges stored during the shift, e.g., by intermittently reading an image in synchronization with the shift of the sampling position. However this approach gives rise to a problem that it takes a longer time to read the image since the image reading is repeatedly interrupted.

The deterioration in the resolving power can also be avoided by idly reading one frame image information after the sampling position shift or by discharging or wasting signal charges of one field. However either of the methods also gives rise to a problem that it takes a longer time to read image information for each screen.

SUMMARY OF THE INVENTION

In view of the foregoing observations and description, the primary object of the present invention is to provide an image reading method in which a deterioration in the resolving power due to shift of the sampling position can be avoided without elongating the time required for image reading.

The image reading method in accordance with the present invention includes the step of reading image information for one screen while moving an image taking device so that a sampling position is shifted to make a round and to return the original position in n frames. The sampling position is shifted after stored signal charges of each frame are transmitted to a transmission section and signal charges stored in a photoelectric conversion section are discharged at latest by the end of sampling position shift, thereby discharging outside signal charges stored during sampling position shift.

In one embodiment, each of the frames is formed by first and second fields respectively for reading out charges on even lines and odd lines, and signal charges are discharged after charges stored in each field are transmitted to the transmission section. The terms "first field" and "second field" as used here simply denote different fields and are not for the purpose of designating order.

In accordance with the image reading method of the present invention, image information for one screen is read by an image taking device in which employed a system where the sampling position is shifted to make a round and to return the original position in n frames. When the sampling position is shifted, signal charges are stored even during shift of the sampling position and the resolving power is deteriorated.

By discharging outside the signal charges stored during the shift, deterioration in the resolving power due to the sampling position shift can be avoided.

The signal charges can be discharged by driving the image taking device in a pseudo-field store mode.

In the pseudo-field store mode, storing and readout of signal charges are performed by the field time and the signal charges in the first and second fields forming each frame are read out divided into those stored in the picture elements on the even lines and the odd lines. At this time, after the signal charges stored in the picture elements on the even lines or the odd lines are transmitted to the transmission section, the stored signal charges are discharged outside. In this case, discharge of the signal charges is effected twice in each frame. In this manner, the stored signal charges are discharged during the sampling position shift and the storing time for the field whose sampling position is shifted becomes equal to that for the field whose sampling position is not shifted.

BRIEF DESCRIPTION OF THE DRAWINGS

FIG. 2 is a schematic view for illustrating another image reading method in accordance with an embodiment of the present invention.

DESCRIPTION OF THE PREFERRED EMBODIMENTS

Figure 1A:
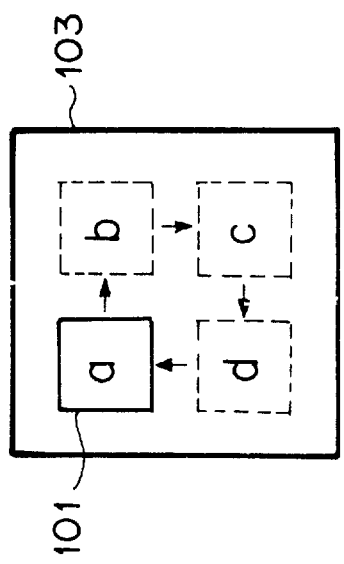
FIG. 1A is a schematic view for illustrating an image reading method in accordance with an embodiment of the present invention.

As shown in FIG. 1A, in one embodiment of the present invention, a light receiving opening 101 of a CCD is shifted from position a to position d via positions b and c. Thus a unit picture element 103 includes four sampling positions and one screen is formed by four frames, a frame, b frame, c frame and d frame.

Figure 1B:
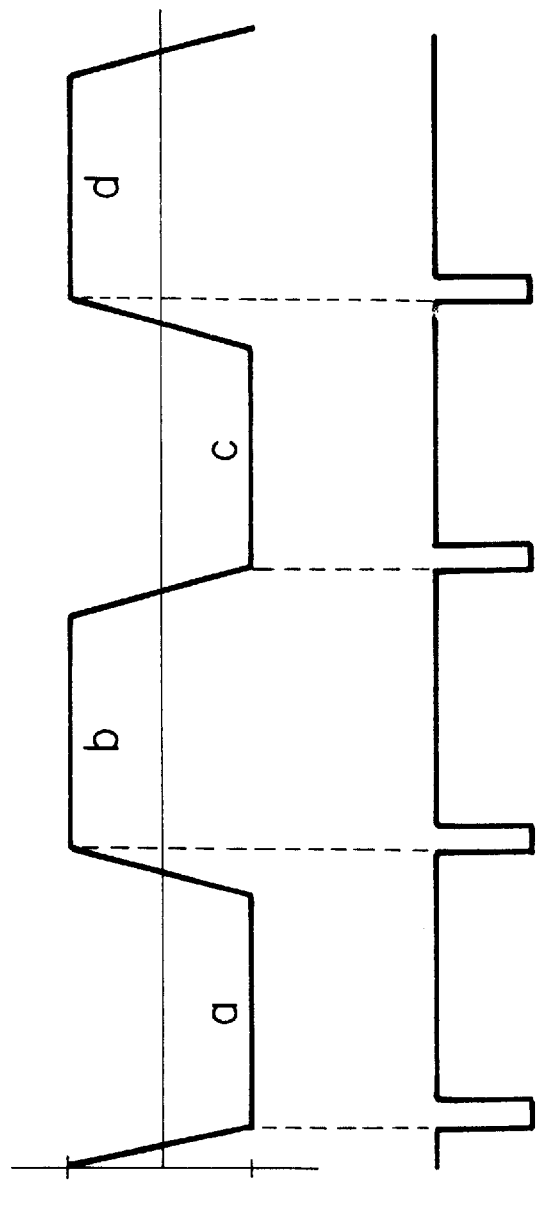
FIG. 1B illustrates the shift position relative to the discharge.

As shown in FIG. 1B, each time the light receiving opening 101 is shifted, the CCD discharges signal charges stored during the shift. Discharge of the signal charges may be completed at latest by the end of the shift, and accordingly may be effected simultaneously with the shift.

Another embodiment of the present invention will be described with reference to FIGS. 2 and 3, hereinbelow. In this embodiment, the CCD whose light receiving opening 101 is shifted from position a to position d via positions b and c as shown in FIG. 1A is driven in a pseudo-field store mode.

FIG. 2 shows the pseudo-field store mode. One frame is formed by first and second fields. In the first field, the signal charges in the picture elements on the even lines are transmitted from photoelectric conversion sections 151 to a horizontal transmission section 155 through vertical transmission sections 153, whereby the signal charges are read out. After the signal charges in the picture elements on the even lines are transmitted to the vertical transmission sections 153, the charges in all the picture elements are discharged. In the second field, the signal charges in the picture elements on the odd lines are transmitted from photoelectric conversion sections 151 to the horizontal transmission section 155 through the vertical transmission sections 153, whereby the signal charges are read out. After the signal charges in the picture elements on the odd lines are transmitted to the vertical transmission sections 153, the charges in all the picture elements are discharged.

Figure 3:
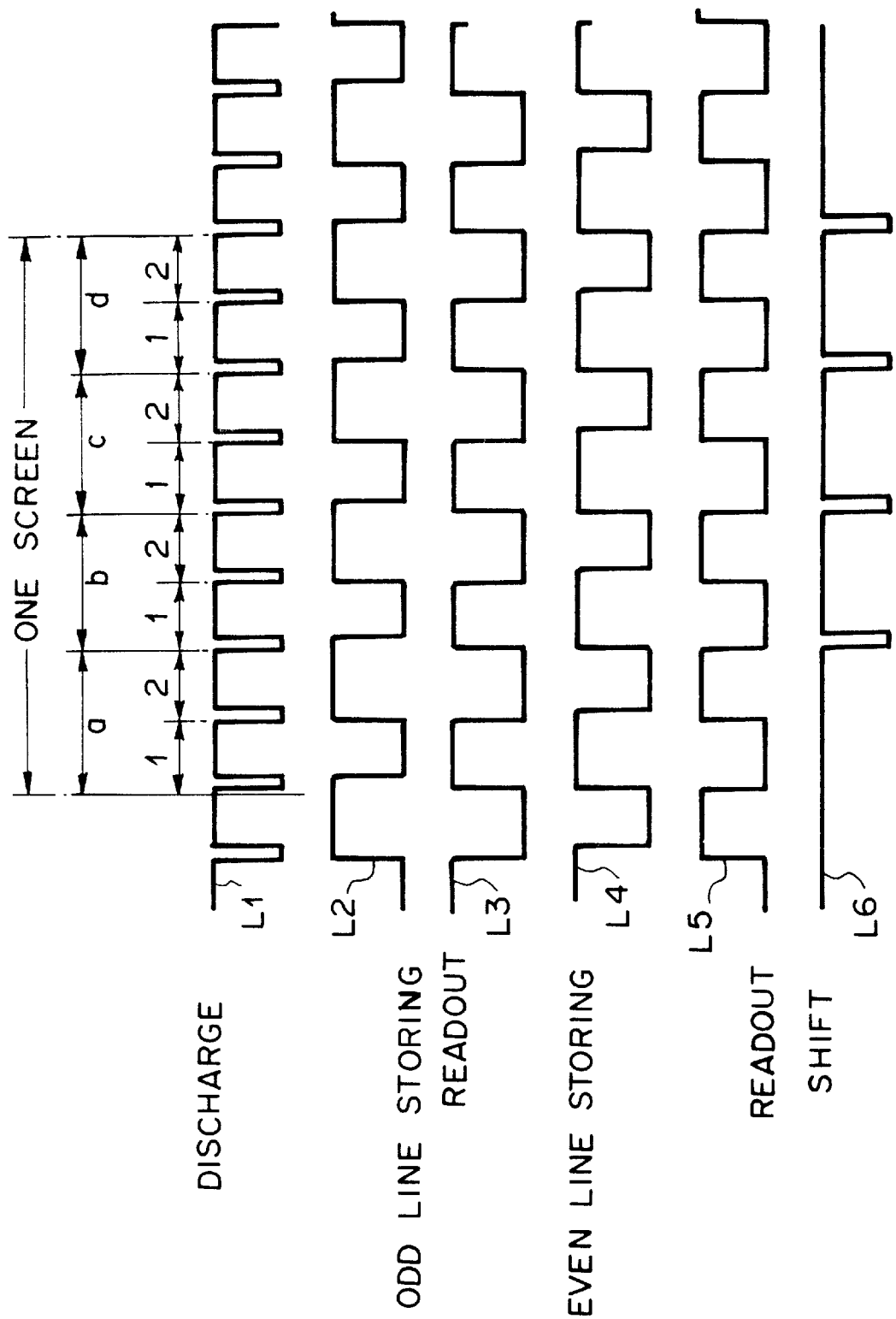
FIG. 3 is a view showing the timing of actions for driving the CCD in the pseudo-field store mode.

FIG. 3 shows the timing of actions for driving the CCD shown in FIGS. 1A and 1B in the pseudo-field store mode shown in FIG. 2. In FIG. 3, line L1 shows the timing of discharging the stored signal charges, line L2 shows the timing of the light receiving portions of the picture elements on the odd lines storing the signal charges, line L3 shows the timing of reading out the signal charges stored in the picture elements on the odd lines, line L4 shows the timing of the light receiving portions of the picture elements on the even lines storing the signal charges, line L5 shows the timing of reading out the signal charges stored in the picture elements on the even lines, and line L6 shows the timing of shifting the sampling position. Transmission of the stored charges to the transmission sections are effected at the beginning of the readout and discharge of the charges started after the transmission.

One frame is formed by a pair of fields, the first and second fields. The timings described are shown in a low active state.

Operation when the sampling position is shifted by driving the CCD in the pseudo-field store mode will be described, hereinbelow.

In the first field in position a in FIG. 3, the signal charges in the picture elements on the even lines stored in position d for the preceding screen are read out. Concurrently with the readout, the sampling position is shifted and all the signal charges are discharged after the end of the sampling position shift. After the end of the discharge of the signal charges, signal charges are stored. Upon initiation of the second field, the signal charges in the odd line picture elements are transmitted to the transmission section and readout is started. After the end of the transmission, the charges in all the picture elements are discharged concurrently with the readout. After the end of the discharge, signal charges are stored and then the signal charges in the even line picture elements are transmitted to the transmission section. After the end of the transmission, the sampling position is shifted from position a to position b concurrently with readout of the signal charges in the even line picture elements.

The signal charges stored during the sampling position shift are discharged in the manner described above, thereby preventing deterioration in the resolving power.

By repeating the actions described above four times (for four frames), image information for one screen is obtained.

Discharge of signal charges is performed in order to discharge the signal charges stored during the sampling position shift, thereby preventing deterioration in the resolving power generated by the sampling position shift. Accordingly, in the second field where the sampling position is not shifted, discharge of signal charges is basically not necessary.

However if there simultaneously exists a field which has been discharged with signal charges and a field which has not been discharged with signal charges, the amount of stored signal charges varies from field to field, which results in different sensitivities of the fields. Accordingly in order to match the sensitivities of the fields with each other, discharge of the signal charges is carried out for even the field which need not be discharged with the charges.

When an image is read while moving the sampling position by driving the CCD in the pseudo-field store mode, the resolving power can be improved since shifting the sampling position is equivalent to increasing the number of the picture elements. Further by employing the pseudofield store mode, signal charges stored during the sampling position shift are discharged, whereby deterioration in the resolving power generated by the sampling position shift can be prevented.

In this embodiment, since the CCD is shifted at a constant speed, discharge of signal charges is effected in the same period for all the fields. However in the case where the shifting speed of the picture elements varies from field to field and accordingly the amount of stored signal charges varies from field to field, the discharging period may be varied from field to field.

Though, in the embodiment described above, the signal charges in the even line picture elements are read out in the first field and the signal charges in the odd line picture elements are read out in the second field, it is needless to say that the signal charges in the odd line picture elements may be read out in the first field with the signal charges in the even line picture elements read out in the second field.

Figure 4:
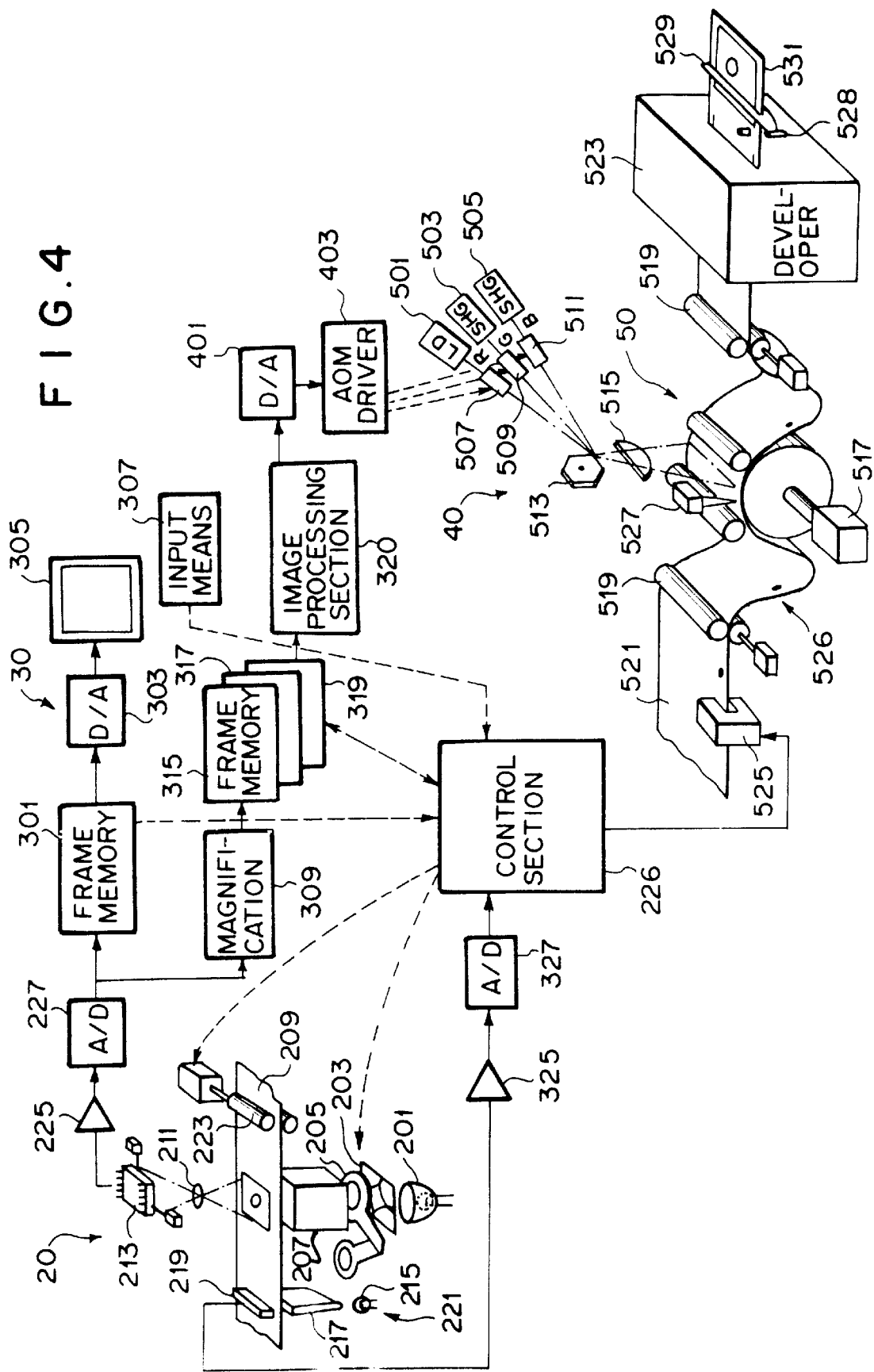
FIG. 4 is a schematic view showing a digital photoprinter to which the present invention is applied.

A digital photoprinter to which the present invention can be applied will be described with reference to FIG. 4, hereinbelow. In FIG. 4, flow of the image information is shown by the solid line, flow of the control signal is shown by the broken line and light bundle is shown by the chained line.

In FIG. 4, the digital photoprinter comprises an image reading section 20 which reads in sequence images recorded on a film, a setup system 30 which simulates and displays the image read by the image reading section 20 and identifies the image quality to determine the condition of image formation (setup condition), and an image forming system 40 which causes light beam to scan a photosensitive medium according to the determined by the setup system 30 and develops the exposed photosensitive medium to obtain a finished print.

In the image reading section 20, reading light emitted from a light source 201 is regulated by a light regulating section 203, enters a RGB filter 205 to be subjected to color adjustment and then enters a diffusion box 207. The reading light diffused in the diffusion box 207 enters film 209 and transmitted light passed through the film 209 is focused on a light receiving face of a CCD 213 through a focusing lens 211.

The image recorded on the film 209 is detected on the basis of the output of an image position detecting section 221. The image position detecting section 221 comprises a light source 215, a collector section 217 and a photosensor 219, and a control section 226 detects the image recorded on the film 209 on the basis of the output of the photosensor 219 amplified by an amplifier 325 and converted to a digital signal by an A/D convertor 327. The control section 226 controls feeding rollers 223 on the basis of the result of the detection to feed the film 209 in the direction of the arrow and brings the image in a reading position.

The CCD 213 is provided with a mechanism for moving the light receiving opening as described above in conjunction with FIG. 1 and reads the image on the film 209 by the three primary colors, R, G and B, while shifting the sampling position. The image information of each color read by the CCD 213 are converted to a digital signal by an A/D convertor 227 after amplified by an amplifier 225 and then supplied to the setup system 30.

The image information supplied to the setup system 30 is stored in a frame memory 301 for pre-scan and the image information for one exposure frame of the film 209 stored in the frame memory 301 is converted to an analog signal by a D/A convertor 303 and an image is reproduced on a display 305.

The operator views the image on the display 305 and determines the setup condition through an input means 307 if necessary.

Further the three pieces of image information for the respective colors supplied to the setup system 30 are stored in three frame memories 315, 317 and 319 for fine scan. The image information stored in each of the frame memories 315, 317 and 319 is input into an image processing section 320. The image processing section 320 executes setup calculations such as color correction, gradation correction and the like and then supplies the information to the image forming system 40. The pieces of information supplied to the image forming system 40 are converted to analog signals by a D/A convertor 401 and input to an acoustooptic modulator driver 403.

An image exposing section 50 of the image forming system 40 comprises a laser diode 501 which emits a light beam for exposing a red-sensitive layer on a photosensitive medium 521, a second harmonic generator 503 for exposing a green-sensitive layer on the photosensitive medium 521, a second harmonic generator 505 for exposing a blue-sensitive layer on the photosensitive medium 521, acoustooptic modulators 507, 509 and 511 which respectively modulate the light beams emitted from the three light sources according to the image to be recorded, a polygonal mirror 513 and an fθ lens 515 and causes the light beams to scan the photosensitive medium 521 which is fed by a sub-scanning means 517 and a pair of conveyor rollers 519.

Perforations 526 for identifying frames on the photosensitive medium 521 are formed in the photosensitive medium 521 by a perforator 525 under the control of the control section 226. By detecting the perforations by a perforation sensor (reflection type) 527, the exposure position is determined.

The exposed photosensitive medium 521 is transferred to a processor 523 and developed. The processed photosensitive medium 521 is cut by a cutter 529 according to a result of detection of a perforation sensor (transmission type) 528, whereby finished prints 531 are obtained.

As can be understood from the description above, in accordance with the present invention, when image information for one screen is read while shifting the sampling position, signal charges stored during the sampling position shift are discharged. Accordingly, deterioration in the resolving power can be prevented, and at the same time, since the signal charges can be continuously read out, the reading time is not elongated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image reading method comprising the steps of:

reading image information for one screen while moving an image taking device so that a sampling position is shifted to traverse all frames and to return the original position in n frames, each frame including a plurality of fields;

transmitting stored signal charges of each of the plurality of fields to a transmission section;

shifting the sampling position to another frame after the stored signal charges of each field of the n frame are transmitted to the transmission section;

initiating discharging of signal charges stored in a photoelectric conversion section, independent of whether the sampling position has been shifted to another frame; and completing the discharging of the signal charges at latest by the end of the shifting of the sampling position, thereby discharging outside signal charges stored during sampling position shift and matching sensitivities of all fields.

2. The method as defined in claim 1, further comprising forming each of the frames by first and second fields respectively for reading out charges on even lines and odd lines, and signal charges are discharged after charges stored in each field are transmitted to the transmission section.

3. The method as defined in claim 1, further comprising varying a length of a period the discharging in accordance with speed of the shifting.

4. The method as defined in claim 1, wherein discharging of signal charges is carried out a plurality of times for each frame.

5. The method as defined in claim 1, wherein discharging of signal charges is carried out for each field of each frame.

6. The method as defined in claim 1, wherein discharging of signal charges is initiated simultaneously for all fields of a frame.

7. An apparatus comprising:

a detector reading image information for one screen while moving an opening for the detector so that a sampling position is shifted to traverse all frames and to return the original position in n frames, each frame including a plurality of fields;

means for transmitting stored signal charges of each of the plurality of fields to a transmission section;

means for shifting the sampling position to another frame after the stored signal charges of each field of the n frame are transmitted to the transmission section; and means for initiating discharging of signal charges field independent of whether that field has been shifted by said stored in a photoelectric conversion section, independent of whether the sampling Position has been shifted to another frame, and for completing the discharging of the signal charges at latest by the end of the shifting of the sampling position, thereby discharging outside signal charges stored during sampling position shift and matching sensitivities of all fields.

8. The apparatus as defined in claim 7, further comprising means for forming each of the frames by first and second fields respectively for reading out charges on even lines and odd lines, and signal charges are discharged after charges stored in each field are transmitted to the transmission section.

9. The apparatus as defined in claim 7, further comprising means for varying a length of a period the discharging in accordance with speed of the shifting.

10. The apparatus as defined in claim 7, wherein discharging of signal charges is carried out a plurality of times for each frame.

11. The apparatus as defined in claim 7, wherein discharging of signal charges is carried out for each field of each frame.

12. The apparatus as defined in claim 7, wherein discharging of signal charges is initiated simultaneously for all fields of a frame.

* * * * *